US006922838B2

(12) United States Patent
Wong

(10) Patent No.: US 6,922,838 B2
(45) Date of Patent: Jul. 26, 2005

(54) OPTICAL DISC DRIVE WITH MEMORY MEDIUM ACCESSING MODULE

(75) Inventor: Man-Wai Wong, Taoyuan (TW)

(73) Assignee: BenQ Corporation, Taoyuan (TW)

( * ) Notice: Subject to any disclaimer, the term of this patent is extended or adjusted under 35 U.S.C. 154(b) by 261 days.

(21) Appl. No.: 10/441,526

(22) Filed: May 20, 2003

(65) Prior Publication Data
US 2003/0229751 A1 Dec. 11, 2003

(30) Foreign Application Priority Data
May 21, 2002 (TW) ...................................... 91207297 U

(51) Int. Cl.$^7$ ........................... G11B 7/24; G11B 17/03; G11B 17/04
(52) U.S. Cl. ........................................ 720/616; 720/720
(58) Field of Search ................................ 720/616, 718, 720/720, 601; 369/273, 69; 711/100, 112

(56) References Cited
U.S. PATENT DOCUMENTS
6,845,509 B2 * 1/2005 Hsieh et al. ................. 720/601

2004/0163098 A1 * 8/2004 Ishida et al. ................. 720/720

FOREIGN PATENT DOCUMENTS

| JP | 11288549 A | * | 10/1999 | ........... G11B/19/02 |
|----|------------|---|---------|----------------------|
| JP | 2001035067 A | * | 2/2001 | ........... G11B/19/04 |
| JP | 2002092966 A | * | 3/2002 | ........... G11B/7/24 |
| JP | 2002170366 A | * | 6/2002 | ........... G11B/33/02 |
| JP | 2002197824 A | * | 7/2002 | ........... G11B/23/00 |

* cited by examiner

Primary Examiner—William J Klimowicz
(74) Attorney, Agent, or Firm—Quintero Law Office

(57) ABSTRACT

An optical disc drive with a memory medium accessing module to access an optical disc and a memory medium. The optical disc drive includes a main body, a tray, a memory medium transformer and a connector. The tray is disposed on the main body. The tray supports the optical disc when the optical disc is used. The memory medium transformer is placed on the tray to load the memory medium electrically connected thereto. The connector is disposed in the main body. The tray is received in the main body and the connector is electrically connected to the memory medium transformer when the memory medium is used and the tray supports the memory medium transformer.

18 Claims, 6 Drawing Sheets ically connected to the memory medium 10. Nevertheless, it is inconvenient to use an external memory medium accessing module 13 to access the personal computer 11.

OPTICAL DISC DRIVE WITH MEMORY MEDIUM ACCESSING MODULE

BACKGROUND OF THE INVENTION

1. Field of the Invention

The present invention relates to an optical disc drive, and in particular to an optical disc drive that accesses a memory medium by means of a memory medium transformer.

2. Description of the Related Art

Referring to FIG. 1A, when a memory medium 10 is accessed, a conventional external memory medium accessing module 13 requires connection to a personal computer 11 by a cable 14. After the memory medium 10 is inserted into the port 12 of the memory medium accessing module 13, the memory medium accessing module 13 is electrically connected to the memory medium 10, such that the memory medium 10 can be accessed. Nevertheless, it is inconvenient to use an external memory medium accessing module 13 to access the personal computer 11.

Referring to FIG. 13, another personal computer 11' has an internal memory medium accessing module 15 to access the memory medium 10. Nevertheless, the internal memory medium accessing module 15 takes up a lot of space in the personal computer 11'.

Hence, there is a need to provide an optical disc drive with a memory medium accessing module. The personal computer can access the memory medium by means of the memory medium accessing module of the optical disc drive.

SUMMARY OF THE INVENTION

Accordingly, an object of the invention is to provide an optical disc drive with a memory medium accessing module to access an optical disc and a memory medium. The optical disc drive includes a main body, a tray, a memory medium transformer and a connector. The tray is disposed on the main body. The tray supports the optical disc when the optical disc is used. The memory medium transformer is placed on the tray to load the memory medium electrically connected thereto. The connector is disposed in the main body. The tray is received in the main body and the connector is electrically connected to the memory medium transformer when the memory medium is used and the tray supports the memory medium transformer.

Preferably, the optical disc drive further comprises an optical accessing module to access the optical disc.

Preferably, the memory medium is a flash memory.

Preferably, the tray further comprises a recess and the memory medium transformer further comprises a round portion. The recess accommodates the optical disc and the round portion, Preferably, the tray further comprises a first engaging portion to engage the memory medium transformer when the memory medium transformer is placed in the recess.

Preferably, the round portion further comprises a port to accommodate the memory medium.

Preferably, the round portion further comprises a second engaging portion to engage the memory medium when the memory medium is inserted to the port.

Preferably, the memory medium transformer further comprises a connection portion extending from the round portion. The connection portion has a plurality of metal connection parts. The memory medium transformer is electrically connected to the connector by means of the metal connection parts.

Preferably, the memory medium transformer is moved into the main body by the tray to electrically connect the metal connection parts of the connection portion to the connector.

Preferably, the round portion and connection portion of the memory medium transformer are integrally formed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1A:
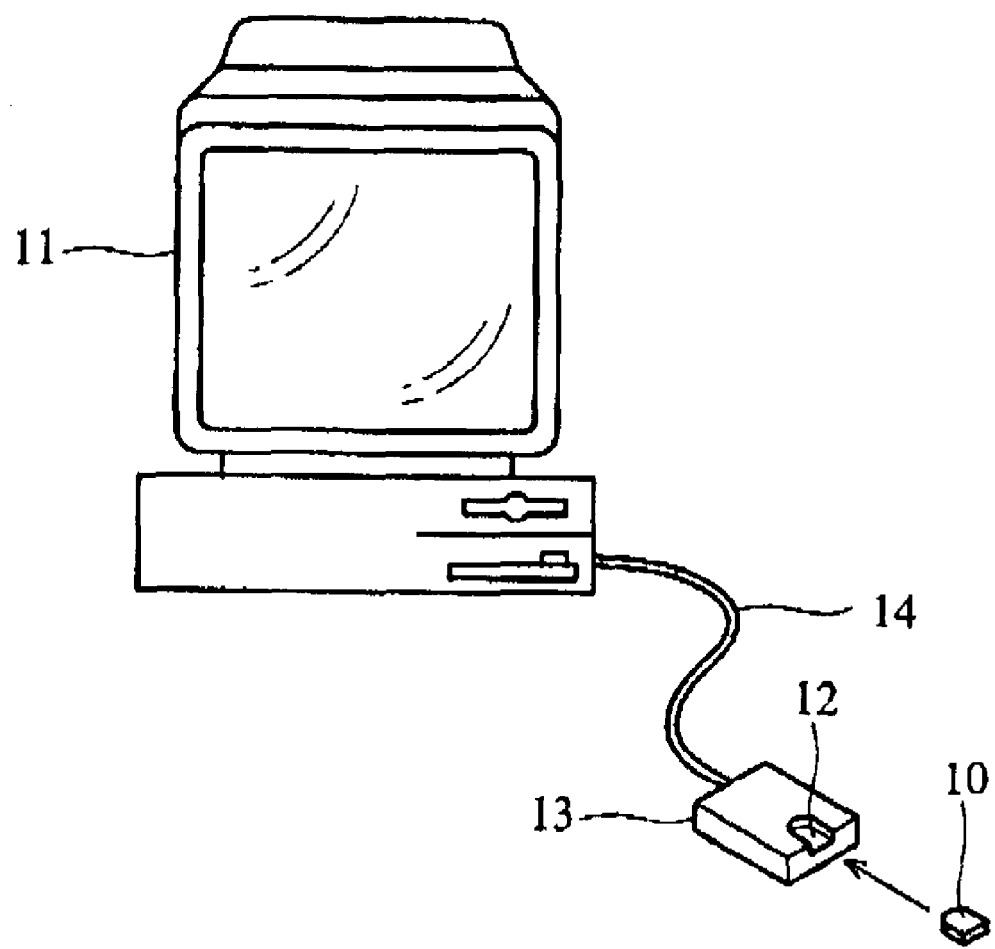
FIG. 1A is a schematic view showing a conventional personal computer and external memory medium accessing module.
Figure 1B:
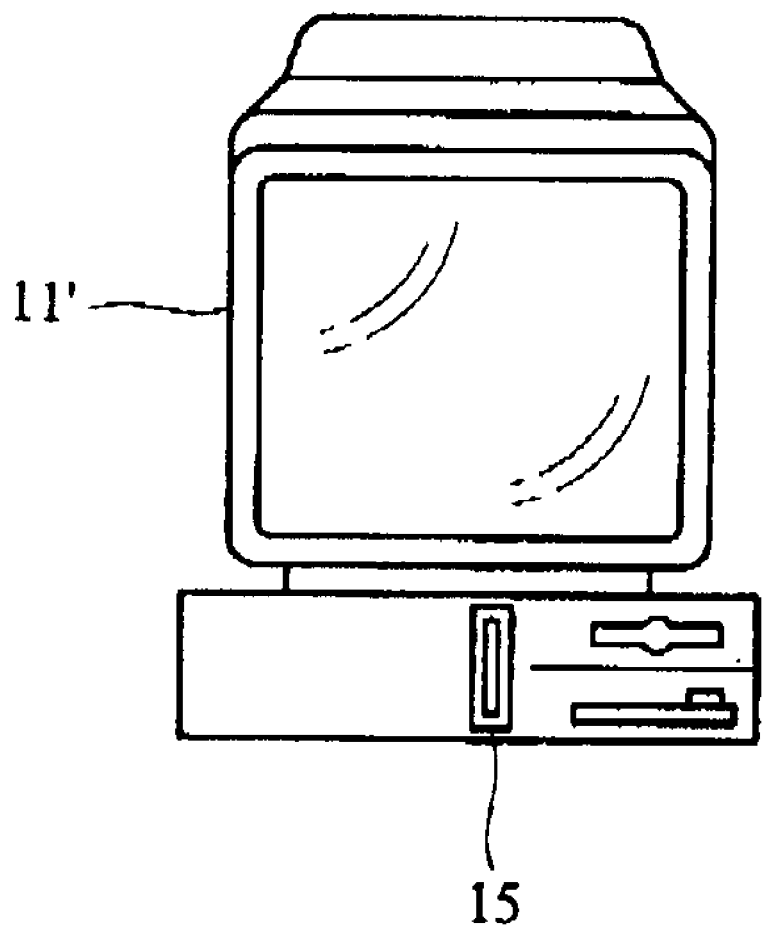
FIG. 1B is a schematic view showing a conventional personal computer having a memory medium accessing module.
Figure 2:
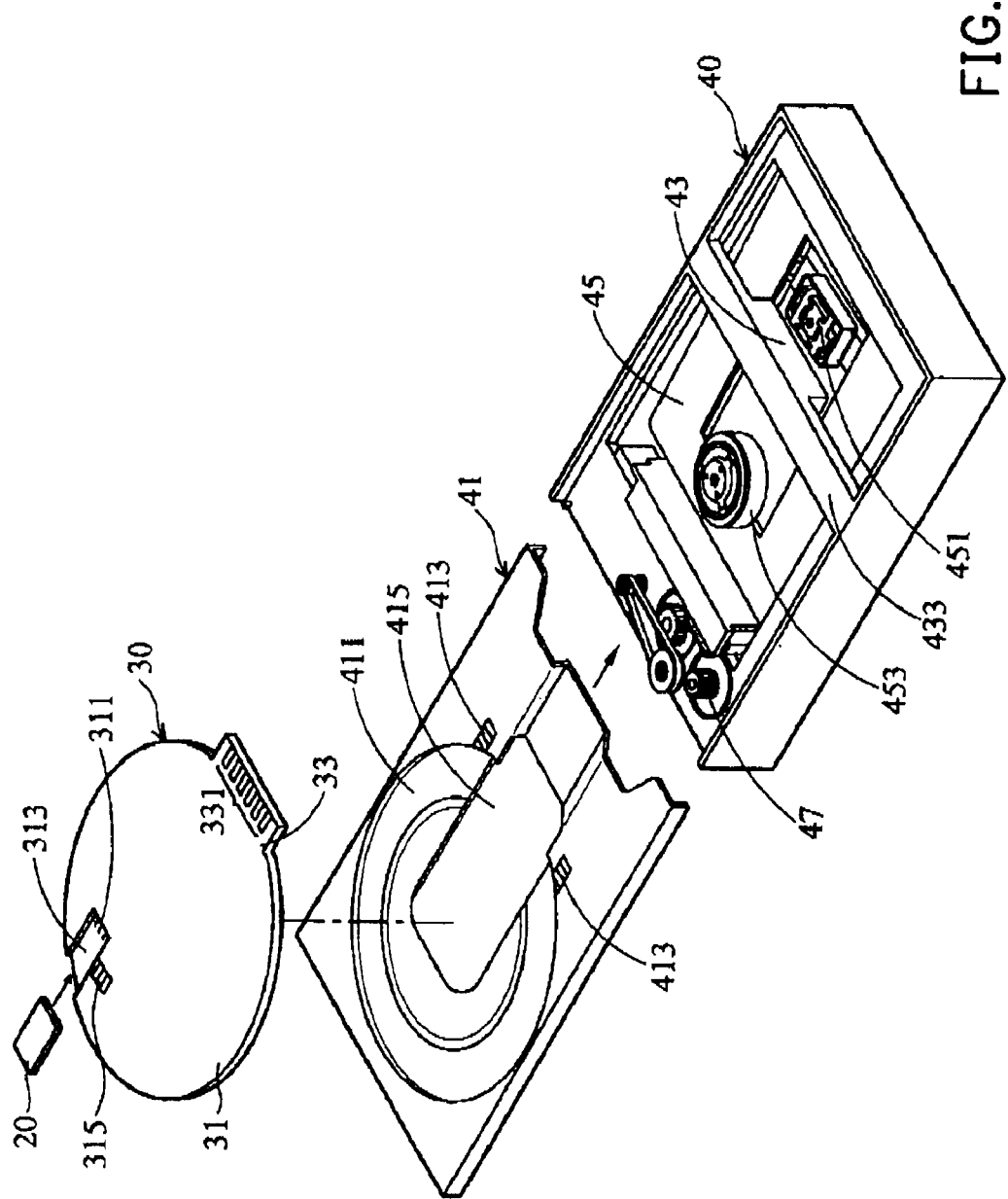
FIG. 2 is a perspective exploded view showing the optical disc drive with a memory medium accessing module of the first embodiment of the invention.

Referring to FIG. 2, the optical disc drive 100 includes a main body 40, a tray 41, and a memory medium transformer 30. Some elements disposed on the main body 40 are omitted for simplification of the description.

As shown in FIG. 2, the main body 40 has a connector 43, a gear set 47 and a supporting base 45. An optical accessing module 451 and a rotating shaft 453 are disposed on the supporting base 45. The tray 41 is driven by the gear set 47 and moved into and out of the main body 40. Meanwhile, the tray 41 is moved on the supporting base 45. The connector 43 is disposed on a connection arm 433 and located above the tray 41. The tray 41 has a recess 411, two first engaging portions 413 and a through hole 415. The recess 411 accommodates an optical disc (not shown) and the memory medium transformer 30. The memory medium transformer 30 is fixed on the tray 41 by the first engaging portions 413. When the supporting base 45 rises, the optical accessing module 451 can move in the through hole 415, such that the optical accessing module 451 does not hit the tray 41. When the optical disc is used, the tray 41 is received in the main body 40 and the supporting base 45 in combination with the optical accessing module 451 and rotating shaft 453 rise. Then, the optical disc is rotated by the rotating shaft 453 and accessed by the optical accessing module 451.

Figure 3:
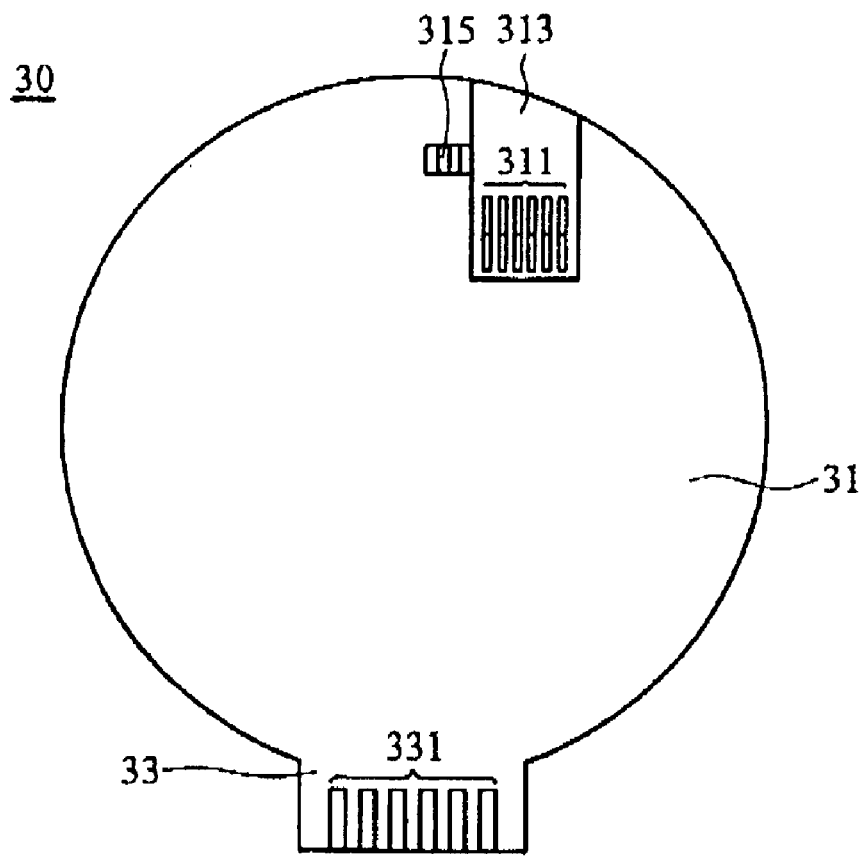
FIG. 3 is a top view showing the memory medium transformer of the first embodiment of the invention.

As shown in FIG. 2 and FIG. 3, the memory medium transformer 30 has a round portion 31 and a connection portion 33 extending therefrom. The round portion 31 and connection portion 33 are integrally formed. The round portion 31 has the same diameter as the optical disc such that the round portion 31 can be placed in the recess 411 of the tray 41. The round portion 31 has a port 313 and a second engaging portion 315. A plurality of metal fingers 311 are disposed in the port 313. A memory medium 20 can be inserted to the port 313 and fixed by the second engaging portion 315. The metal fingers 311 of the memory medium transformer 30 are electrically connected to corresponding metal connection parts (not shown) formed on the memory medium 20. Additionally, a plurality of metal connection parts 331 are formed on the connection portion 33 of the memory medium transformer 30. The metal connection parts 331 are electrically connected to the metal reeds 311 by way of a circuit board (not shown) disposed in the memory medium transformer 30. When the memory medium 20 is used and the tray 41 supports the memory medium transformer 30, the tray 41 is received in the main body 40 to electrically connect the connector 43 disposed in the main body 40 to the metal connection parts 331 formed on the connection portion 33 of the memory medium transformer 30. Thus, the memory medium 20 can be accessed through the main body 40 and the memory medium transformer 30.

Figure 4:
FIG. 4 is a schematic view showing the connector of the first embodiment of the invention.

As shown in FIG. 2 and FIG. 4, the connector 43 disposed on the connection arm 433 has a plurality of metal fingers 431 facing downward. When the tray 41 supports the memory medium transformer 30 and is received in the main body 40, the metal connection parts 331 of the connection portion 33 are electrically connected to the metal fingers 431 of the connector 43.

Second Embodiment

Figure 5:
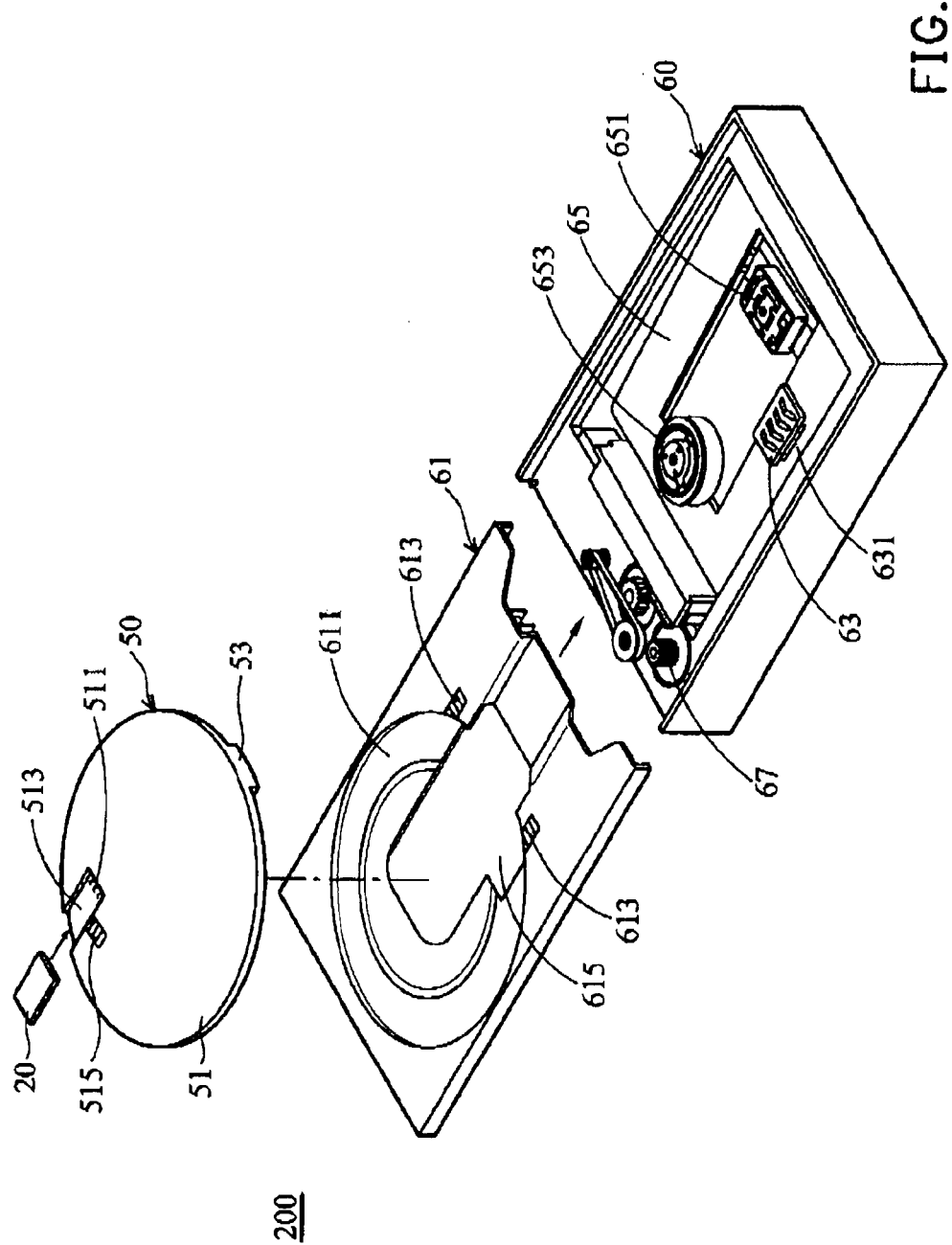
FIG. 5 is a perspective exploded view showing the optical disc drive with a memory medium accessing module of the second embodiment of the invention.

Referring to FIG. 5, the optical disc drive 200 includes a main body 60, a tray 61 and a memory medium transformer 50. Some elements disposed on the main body 50 are omitted for simplification of the description.

As shown in FIG. 5, the main body 60 includes a connector 63, a gear set 67 and a supporting base 65. An optical accessing module 651 and a rotating shaft 653 are disposed on the supporting base 65. The tray 61 is driven by the gear set 67 and moved into and out of the main body 60. Meanwhile, the tray 61 is moved on the supporting base 65. The tray 61 has a recess 611, two first engaging portions 613 and a through hole 615. The recess 611 accommodates an optical disc (not shown) and the memory medium transformer 50. The memory medium transformer 50 is fixed on the tray 61 by the first engaging portions 613. Specifically, the connector 63 is disposed on one side of the supporting base 65, and the inner wall of the through hole 615 has a recession corresponding to the connector 63. When a memory medium 20 is used, the tray 61 is received in the main body 60. Then, the supporting base 65 in combination with the connector 63 rise to electrically connect the connector 63 to the memory medium transformer 50.

Figure 6A:
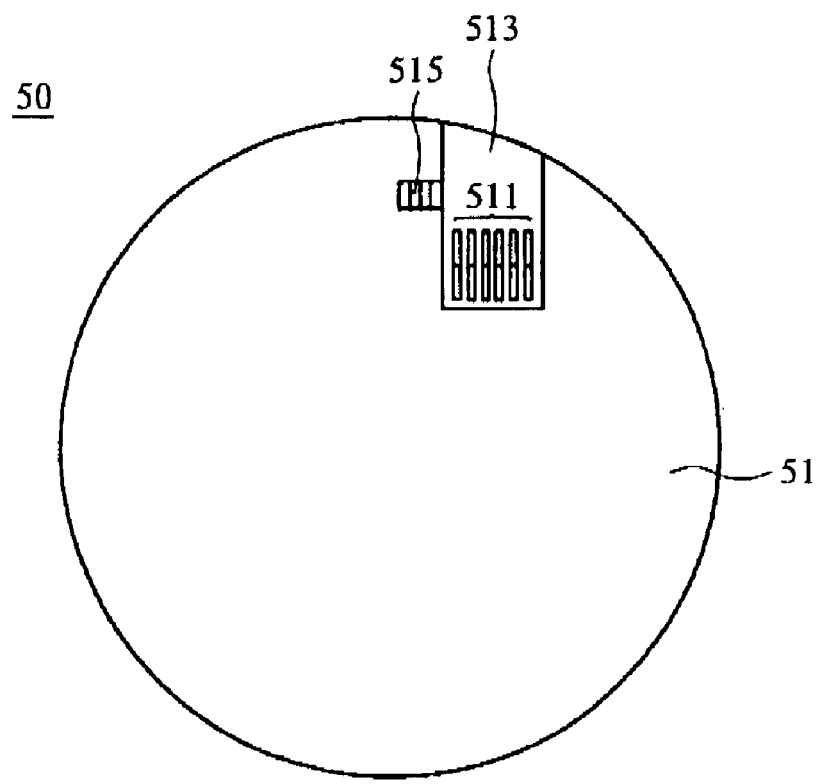
FIG. 6A is a top view showing the memory medium transformer of the second embodiment of the invention.
Figure 6B:
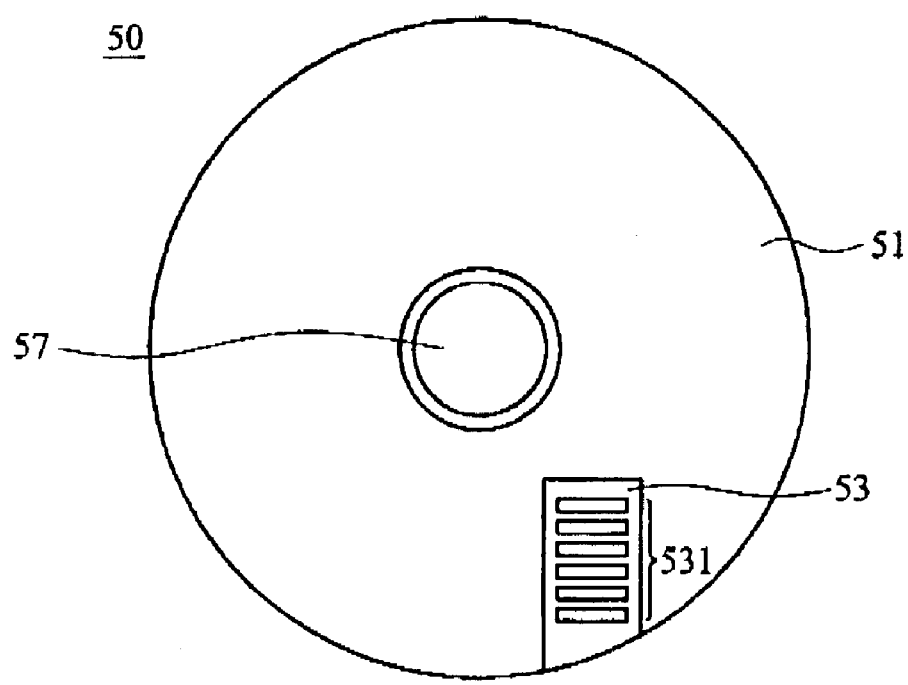
FIG. 6B is a bottom view showing the memory medium transformer of the second embodiment of the invention.

Referring to FIG. 6A and FIG. 6B, the memory medium transformer 50 has a round portion 51 and a protrusion 53 extending from the bottom of the round portion 51. Additionally, a recess 57 is formed on the bottom of the round portion 51 to accommodate the rotating shaft 653. The round portion 51 and protrusion 53 are integrally formed. The round portion 51 has the same diameter as a general optical disc such that the round portion 51 can be placed in the recess 611 of the tray 61. The round portion 51 has a port 513 and a second engaging portion 515. A plurality of metal fingers 511 are disposed in the port 513. A memory medium 20 can be inserted to the port 513 and fixed by the second engaging portion 515. The metal fingers 511 of the memory medium transformer 50 are electrically connected to corresponding metal connection parts (not shown) formed on the memory medium 20. The protrusion 53 of the memory medium transformer 50 corresponds to the recession formed on the inner wall of the through hole 615, such that the protrusion 53 fit into the recession. Additionally, a plurality of metal connection parts 531 are formed on the protrusion 53 of the memory medium transformer 50. The metal connection parts 531 are electrically connected to the metal fingers 511 by way of a circuit board (not shown) disposed in the memory medium transformer 50. When the memory medium 20 is used and the tray 61 supports the memory medium transformer 50, the tray 61 is received in the main body 60. Then, the supporting base 65 rises and the rotating shaft 653 is positioned in the recess 57. The metal fingers 631 of the connector 63 disposed on the supporting base 65 are electrically connected to the metal connection parts 531 formed on the protrusion 53 of the memory medium transformer 50. Thus, the memory medium 20 can be accessed through the main body 60 and the memory medium transformer 50.

Specifically, the structure of the optical disc drive and the memory medium transformer in the first and second embodiments is applicable to an internal or external optical disc drive. The shape of the port formed on the memory medium transformer, the arrangement of the metal fingers and the decoding manner of the circuit board can be changed to match different memory medium types. Furthermore, the memory medium transformer can has a plurality of ports corresponding to different memory media. Thus, the optical disc drive can access the different memory media.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. An optical disc drive with a memory medium accessing module to access an optical disc and a memory medium, comprising:
 a main body;
 a tray disposed on the main body, the tray supporting the optical disc when the optical disc is used;
 a memory medium transformer placed on the tray to load the memory medium electrically connected thereto; and
 a connector disposed in the main body, the tray received in the main body and the connector electrically connected to the memory medium transformer.

2. The optical disc drive as claimed in claim 1, further comprising an optical accessing module to access the optical disc.

3. The optical disc drive as claimed in claim 1, wherein the memory medium is a flash memory.

4. The optical disc drive as claimed in claim 1, wherein the tray further comprises a recess and the memory medium transformer further comprises a round portion, the recess accommodating the optical disc and the round portion.

5. The optical disc drive as claimed in claim 4, wherein the tray further comprises a first engaging portion to engage the memory medium transformer when the memory medium transformer is placed in the recess.

6. The optical disc drive as claimed in claim 4, wherein the round portion further comprises a port to accommodate the memory medium.

7. The optical disc drive as claimed in claim 6, wherein the round portion further comprises a second engaging portion to engage the memory medium when the memory medium is inserted to the port.

8. The optical disc drive as claimed in claim 5, wherein the memory medium transformer further comprises a connection portion extending from the round portion, the connection portion having a plurality of metal connection parts, and the memory medium transformer electrically connected to the connector by means of the metal connection parts.

9. The optical disc drive as claimed in claim 8, wherein the memory medium transformer is moved into the main body by the tray to electrically connect the metal connection parts of the connection portion to the connector.

10. The optical disc drive as claimed in claim 8, wherein the round portion and connection portion of the memory medium transformer are integrally formed.

11. An optical disc drive with a memory medium accessing module to access an optical disc and a memory medium, comprising:

a main body;

a supporting base movably disposed in the main body and having an optical accessing module to access the optical disc;

a tray disposed on the main body, the tray supporting the optical disc when the optical disc is used;

a memory medium transformer placed on the tray to load the memory medium electrically connected thereto; and a connector disposed on the supporting base, the tray received in the main body and the supporting base rising to electrically connect the connector to the memory medium transformer.

12. The optical disc drive as claimed in claim 11, wherein the memory medium is a flash memory.

13. The optical disc drive as claimed in claim 11, wherein the tray further comprises a recess and the memory medium transformer further comprises a round portion, the recess accommodating the optical disc and the round portion.

14. The optical disc drive as claimed in claim 13, wherein the tray further comprises a first engaging portion to engage the memory medium transformer when the memory medium transformer is placed in the recess.

15. The optical disc drive as claimed in claim 13, wherein the round portion further comprises a port to accommodate the memory medium.

16. The optical disc drive as claimed in claim 15, wherein the round portion further comprises a second engaging portion to engage the memory medium when the memory medium is inserted to the port.

17. The optical disc drive as claimed in claim 13, wherein the memory medium transformer further comprises a protrusion located between the round portion and the tray, the protrusion having a plurality of metal connection parts, the tray having a through hole to accommodate the protrusion, and the memory medium transformer electrically connected to the connector disposed on the supporting base by means of the metal connection parts.

18. The optical disc drive as claimed in claim 17, wherein the round portion and protrusion of the memory medium transformer are integrally formed.

* * * * *